United States Patent [19]

Kishimoto

[11] Patent Number: 5,424,041
[45] Date of Patent: Jun. 13, 1995

[54] SELF-METABOLIC FUNCTIONAL MATERIAL

[75] Inventor: Yoshio Kishimoto, Hirakata, Japan

[73] Assignee: Matsushita Electric Industrial Co., Ltd., Osaka, Japan

[21] Appl. No.: 188,103

[22] Filed: Jan. 27, 1994

Related U.S. Application Data

[63] Continuation of Ser. No. 975,818, Nov. 13, 1992, abandoned.

[30] Foreign Application Priority Data

| | | | |
|---|---|---|---|
| Nov. 14, 1991 | [JP] | Japan | 3-298744 |
| Apr. 16, 1992 | [JP] | Japan | 4-096380 |
| Sep. 7, 1992 | [JP] | Japan | 4-237875 |
| Sep. 7, 1992 | [JP] | Japan | 4-237876 |

[51] Int. Cl.$^6$ ............................................. C09K 3/00
[52] U.S. Cl. ................................... 422/122; 422/121; 422/5; 252/183.11; 252/62.51; 252/62.56
[58] Field of Search ............. 422/5, 121, 122, 4; 252/183.11, 519, 182.33, 62.51, 62.56, 582, 572

[56] References Cited

U.S. PATENT DOCUMENTS

| | | | |
|---|---|---|---|
| 3,674,666 | 7/1972 | Foster et al. | 204/164 |
| 4,045,544 | 8/1977 | Williston et al. | 252/62.51 |
| 4,078,041 | 3/1978 | Morris | 423/210 |

(List continued on next page.)

FOREIGN PATENT DOCUMENTS

| | | |
|---|---|---|
| 1130220 | 8/1982 | Canada . |
| 0288064 | 10/1988 | European Pat. Off. . |
| 0371945 | 6/1990 | European Pat. Off. . |
| 2002254 | 2/1979 | United Kingdom . |
| 2058737 | 4/1981 | United Kingdom . |

OTHER PUBLICATIONS

U.S. Patent & Trademark Translation of "Kagaku" H. Shirai, vol. 42, No. 5, pp. 307–313, 1987.
U.S. Patent & Trademark Translation of "Functional Material", Tamamura, Dec. 1990, pp. 45–49.
U.S. Patent & Trademark Translation of "Nikkei New Material", Matsushita Electric Works, Inc. & Nippon Steel Corp., Oct. 14, 1991, pp. 56–62.
EPO Search Report, EP Application 92119453, Apr. 5, 1993 (counterpart of present U.S. application) w/additional copies.
EPO Search Report, EP Application 92119453, Apr. 5, 1993 (counterpart of present U.S. application).
Nikkei New Material, Oct. 14, 1991, pp. 56–62.
H. Shirai, *Kagaku* (Chemistry), vol. 42, No. 5, pp. 307–313, 1987.
Y. Tamaura, *Kinou Zairyo* (Functional Material). Dec. 1990, pp. 45–49.

*Primary Examiner*—Robert J. Warden
*Assistant Examiner*—Hein Tran
*Attorney, Agent, or Firm*—Ratner & Prestia

[57] ABSTRACT

The present invention provides a self-metabolic functional material comprising a functional ferromagnetic particles dispersed in a fluid, each of the particles comprising a functional component and a chemically reactive ferromagnetic component with a characteristic of losing a ferromagnetism thereof by a chemical reaction proceeding with time, the functional ferromagnetic particles losing the ferromagnetism by the chemical reaction of the ferromagnetic component with time. The self-metabolic functional material has a desired function and gradually loses its function by being used. The degradation or loss of the function of the material can be detected by degradation or loss of ferromagnetism. By using such a material in the self-metabolic functional apparatus comprising a carrying device and a supply device, the self-metabolic functional material is self-metabolized as follows: The function of the self-metabolic functional material is degraded or lost, and at the same time the ferromagnetism is degraded or lost; and then the self-metabolic functional particles can not be carried on the carrying means. Fresh self-metabolic functional material comprising self-metabolic functional particles by either ferromagnetism and functionality, is carried on the carrying device by the supply device.

11 Claims, 3 Drawing Sheets

U.S. PATENT DOCUMENTS

| | | | |
|---|---|---|---|
| 4,256,698 | 3/1981 | Warncke | 422/122 |
| 4,256,818 | 3/1981 | Bloney et al. | 252/62.56 |
| 4,260,523 | 4/1981 | Tsukamoto | 252/62.56 |
| 4,283,204 | 8/1981 | Savage | 95/27 |
| 4,285,819 | 8/1981 | Yen et al. | 210/679 |
| 4,382,822 | 5/1983 | Mayer | 252/62.56 |
| 4,448,761 | 5/1984 | Sarnecki et al. | 252/62.56 |
| 4,452,773 | 6/1984 | Molday | 424/1.1 |
| 4,537,645 | 8/1985 | Yamaguchi et al. | 252/62.56 |
| 4,604,229 | 8/1986 | Raj et al. | 252/62.56 |
| 4,622,281 | 11/1986 | Imai et al. | 252/62.56 |
| 4,662,352 | 5/1987 | Aviles, Jr. | 422/122 |
| 4,687,596 | 8/1987 | Borduz et al. | 252/62.56 |
| 4,741,921 | 5/1988 | Kitaoka et al. | 252/62.56 |
| 4,758,275 | 7/1988 | Yubakami et al. | 252/62.56 |
| 4,780,239 | 10/1988 | Snyder et al. | 252/184 |
| 4,808,327 | 2/1989 | Rousset et al. | 252/62.56 |
| 4,834,898 | 5/1989 | Hwang | 252/62.51 |
| 4,849,120 | 7/1989 | Price et al. | 252/62.56 |
| 4,857,417 | 8/1989 | Kitaoka et al. | 252/62.56 |
| 4,867,910 | 9/1989 | Meguro et al. | 252/62.56 |
| 4,904,530 | 2/1990 | Huizing et al. | 252/62.56 |
| 4,912,070 | 3/1990 | Mitani | 252/62.56 |
| 5,015,442 | 5/1991 | Hirai | 422/122 |

SELF-METABOLIC FUNCTIONAL MATERIAL

This application is a continuation of application Ser. No. 07/975,818 filed Nov. 13, 1992, now abandoned.

BACKGROUND OF THE INVENTION

1. Field of the Invention

The present invention relates to a self-metabolic functional material having functions such as a chromic function, a catalytic function, an adsorption function, an ion exchange function, a luminescence function, a wavelength conversion function and the like. The present invention relates particularly to a self-metabolic functional material which can maintain a desired function such as deodorization and the like for a long period of time in a refrigerator, an air cleaner, a toilet and the like, and to an apparatus using the self-metabolic functional material.

2. Description of the Related Art

Conventional functional materials having various functions such as a chromic function, a catalytic function, an adsorption function, an ion exchange function, a luminescence function, a wavelength conversion function and the like gradually lose their functions as they are used over a long period of time. Thus, it has been difficult to provide a functional material with a long life. Particularly, a functional material having a solvatochromic function, a catalytic function, an adsorption function or an ion exchange function exhibits its particular function by the stimulations by molecules existing around the functional material; therefore, it can not be protected easily by using a simple window filter, differently from other types of functional materials which exhibit their functions by a stimulation of an electromagnetic wave such as light and radiation. Accordingly, it has been extremely difficult to use such a functional material for a long period of time since it loses its function soon due to contamination, an undesired reaction and the like. Therefore, in the case such a conventional functional material is used, it has to be exchanged manually or by a complicated exchanging machine after a predetermined period.

As for comparatively long-life functional materials, an iron sulfate-ascorbic acid complex and a porous iron treated with an activator, which have a deodorizing function, are disclosed in "Nikkei Nyu Materiaru (Japanese phonetic character)" (Oct. 14, 1991 issued page 56). A deodorant substance comprising iron phthalocyanine carboxylic acid, as a deodorant material, carried on rayon filament for catalytical deodorization at room temperature is disclosed in "Kagaku (Japanese phonetic character)" (Hitcruse Shirai; Vol. 42, No. 5, page 307, 1987; Kagaku Dojin).

However, none of the above-mentioned materials has both a high deodorizing activity and a long life. In other words, they have a high activity initially, but greatly lose the activity over time. Therefore, it is necessary to exchange the deodorizing material or fiber after predetermined periods.

SUMMARY OF THE INVENTION

The self-metabolic functional material of this invention, comprises a functional fluid by ferromagnetism containing particles dispersed in a fluid. Each of the particles comprises a functional component and a chemically reactive ferromagnetic component with a characteristic of losing the ferromagnetism thereof by a chemical reaction proceeding with time, and each of the functional ferromagnetic particles loses its ferromagnetism by the chemical-reaction of the ferromagnetic component over time.

In another aspect, the present invention provides a self-metabolic functional material comprising chargeable functional particles with an electric charge dispersed in a dielectric fluid. Each of the particles comprises a functional component and a chargeable component with a characteristic of losing the electric charge thereof by a chemical reaction or an adsorption proceeding with time, and the chargeable functional particles lose the electric charge thereof by a chemical reaction or an adsorption of the chargeable component with time.

In still another aspect, the present invention provides a self-metabolic functional apparatus comprising a carrying means for carrying the above-mentioned self-metabolic functional material by magnetism or static electricity, a tank containing the self-metabolic functional material, end a supply means for carrying the self-metabolic functional material contained in the tank by magnetism or static electricity to supply to the carrying means.

Thus, the invention described herein makes possible the advantages of (1) providing a functional material having a high activity and a long life; (2) providing a functional material which is used in an apparatus for a desired function for a long period of time and does not require exchange in a short period of time or by a complicated process; and (3) providing an apparatus including the functional material to achieve a desired function for a long period of time.

These and other advantages of the present invention will become apparent to those skilled in the art upon reading and understanding the following detailed description with reference to the accompanying figures.

DESCRIPTION OF THE PREFERRED EMBODIMENTS

Figure 1:
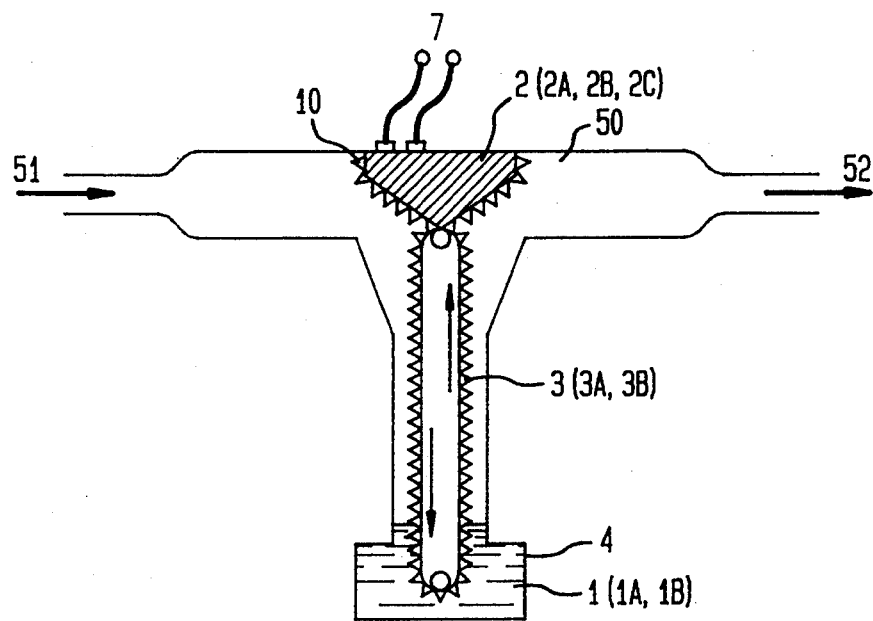
FIG. 1 is a schematic sectional view of an example of a self-metabolic functional apparatus including a self-metabolic functional material of the present invention.

A "self-metabolic functional material" used herein means such a material as follows: The material comprises a fluid in which particles are dispersed, wherein the particles comprise a material which has a desired function such as a chromic function, a catalytic function, an adsorption function and the like, and gradually loses its function after being used; and degradation or loss of the function can be detected with a desired indicator such as degradation or loss of its ferromagnetism or electric charge. Such a fluid is herein referred to as a functional fluid.

In a first self-metabolic functional material according to the present invention, the above-mentioned indicator is ferromagnetism. A chemically reactive ferromagnetic component used herein is preferably a material comprising an iron element. Examples of the ferromagnetic component include ferromagnetic metals such as iron, nickel, cobalt and the like; and ferromagnetic metal oxides such as ferrites including magnetite, manganese ferrite, zinc ferrite and the like. The ferrites are represented by a formula., $MO \cdot Fe_2O_3$; wherein M is $Mn^{2+}$, $Fe^{2+}$, $Co^{2+}$, $Ni^{2+}$, $Cu^{2+}$, $Zn^{2+}$ or the like, among which $Fe^{2+}$, $Co^{2+}$ and $Mn^{2+}$ are preferable, and $Fe^{2+}$ is more preferable. When M is $Fe^{2+}$, the ferrite is magnetite ($Fe_3O_4$). Magnetite is a material having particularly high ferromagnetism. Among the magnetite, oxygen-defective magnetite (active magnetite $Fe_3O_4$-8) is preferred.

Such a chemically reactive ferromagnetic component loses its ferromagnetism due to a reaction caused by a reactive gas or light existing around the functional fluid. The reactive gas can be oxygen when the chemically reactive ferromagnetic component is a material comprising an iron element. When the ferrite loses its ferromagnetism due to its reaction with oxygen, M in $MO \cdot Fe_2O_3$ plays an important part. For example, a magnetite $Fe_3O_4$ is oxidized according to the following formula to be converted into non-magnetic iron oxide α-hematite:

$$2Fe_3O_4 + (O) \rightarrow 3\alpha - Fe_2O_3$$

The oxygen-defective magnetite is particularly preferable because the oxidation reactivity thereof is high. For example, it is disclosed that the oxygen-defective magnetite reduces carbon dioxide into carbon at a temperature of 300° C. at a high conversion rate of nearly 100% in the literature (Yutaka Tamaura, Kinou Zairyo (Japanese phonetic character), December issue, page 44, 1990). The oxygen-defective magnetite has a high reductive reactivity at such a high temperature.

A function of the functional component is at least one selected from the group consisting of a chromic function, a catalytic function, an adsorption function, an ion exchange function, a luminescence function, and a wavelength conversion function. All these functions are exhibited in response to various stimulations.

The chromic function herein means a function to change a color by at least one stimulation selected from the group consisting of light, heat, electricity and other reactive molecules around the functional material. Examples of a component having the chromic function include a number of photochromic materials, thermochromic materials, cathode chromic materials, electrochromic materials, and solvatochromic materials.

The catalytic function herein can be for achieving deodorization (described in a description of the adsorption function below) and combustion. Examples of a component for achieving the combustion include super-fine metal oxide particles or metal particles such as Pt particles and Pd particles.

The adsorption function herein can be for achieving at least one selected from the group consisting of deodorization, degassing, and drying. Examples of a component for achieving the deodorization include activated carbon, ionic salts and metal chelates. Examples of a component for achieving the degassing include porous particles made of metal oxide such as alumina and silica. Examples of a component for achieving the drying include silica gel, $P_2O_5$, CaO, deliquescent materials and hydroscopic polymers.

The deodorization can be achieved by, for example, an redox reaction or a metal chalets formation reaction. Examples of deodorization by the catalytic function and by the adsorption function will now be described.

Examples of a component for achieving the deodorization include organic metal compounds, especially transition metal porphyrin derivatives. Among them, a transition metal phthalocyanine derivative catalytically oxidizes an acidic odorous material such as hydrogen sulfide gas to achieve deodorization. Further, the following compounds achieve deodorization by the catalytic function or adsorption function; the transition metal phthalocyanine derivatives having an anion group, for example, transition metal phthalooyanine carboxylic acids such as iron phthalocyanine octacarboxylic acid; transition metal phthalocyanine sulfonic acid; the salts thereof; and L-ascorbic acid. For example, an acidic odor gas such as hydrogen sulfide and methyl metcaptan is deodorized by catalytical oxidation or a chemical reaction producing sulfur. A basic odor gas such as ammonia and trimetryl amine is deodorized by forming a metal chelate, i.e. forming a quaternary ammonium salt together with the anion group of the transition metal phthalocyanine derivative or forming an ammine complex ion together with the transition metal of The transition metal phthalocyanine derivative. The preferable transition metal included in the organic metallic compounds such as the transition metal phthalocyanine carboxylic acid, the transition metal phthalocyanine sulfonic acid, the transition metal phthalocyanine derivatives and the like is at least one selected from Cu, Ag, Zn, Mn, Fe, Co and Ni. The ions of these transition metals also have an anti-bacterial action.

Examples of the wavelength conversion function include a fluorescent function, a phosphorescent function, a second harmonic generation function and a third harmonic generation function. Examples of a component having the fluorescent function and the phosphorescent function include various dyes end pigments, and examples of a component having the second or third harmonic generation function include non-symmetric high-dielectric crystals.

Examples of a component having the ion exchange function include ionic polymers.

Examples of a component having the luminescence function include electroluminescent and photoluminescent materials.

A particle comprising either the chemically reactive ferromagnetic component or a chargeable component described below, and the functional component according to the present invention (hereinafter, this particle is called the self-metabolic functional particle) can be made of a single material or a combination of two or more materials. A typical example of the single material is the above-mentioned chemically reactive ferromagnetic materials. Such a material has a deodorizing function and a characteristic of losing its ferromagnetism by oxidation. Other examples of the single material include materials having a chemically reactive ferromagnetic segment and a functional segment in one molecule. As for such materials, a complex organic compound which is obtained by chemically (covalently) binding the following two kinds of compounds is included; one is an organic magnetic compound with many radical spins which serves as the chemically reactive ferromagnetic component, and the other is an organic compound with a desired function which serves as the functional component. Also, metal chelates are included in such materials. Such materials have functions according to the type of the functional organic molecules and lose their ferromagnetism due to oxidation. The degradation or loss of ferromagnetism can be an indicator of loss of various functions.

When a self-metabolic functional particle is made of two or more materials, various combinations of materials can be used. For example, at least one of the above-mentioned functional material; end any of the ferromagnetic materials as the indicator for showing the degradation or loss of the function are respectively selected to form the self-metabolic functional particles with a desired function. Each of the self-metabolic functional particles can be prepared by forming particles after mixing a ferromagnetic material and a functional material or by using particles made of the above-mentioned complex organic compound.

A smaller particle size of the self-metabolic functional particles is more suitable, and a particle size of 100 μm or less is preferable. As the particle size of the self-metabolic functional particle becomes smaller, the fluidity of a fluid such as a sol, an aerosol or a colloidal solution including the self-metabolic functional particle becomes higher. Therefore, the fluid can easily flow by magnetism or electric charge. Furthermore, as the particle size becomes smaller, the total specific surface area of the particles becomes larger, thus the reactivity with a reactive gas or light around the functional fluid is increased. However, the ferromagnetic component in the particle is required to have a size of about 10 nm or more to form a single magnetic domain.

When the self-metabolic functional particle is made of a single material, the material is used in the shape of fine particles prepared by grinding, etc. When a combination of two or more materials is used for the self-metabolic functional particle, the materials can be ground into fine particles after being mixed, kneaded with a binder such as a polymer, glass and ceramic, and granulated. In both cases, the fine particles can be made by sintering the single material or mixed materials and pulverizing the sintered material or materials.

The self-metabolic functional particles are preferably porous so as to increase the reactivity with the reactive gas or light existing around the ferromagnetic component. For example, porous particles in which fine particles of iron or ferrite are dispersed are preferably used. Examples of the material for the porous particles include porous polymers.

The fluid in which the self-metabolic functional particles are dispersed is a liquid or gas. The liquid can be any optional liquids, and water, paraffin, ester oil, silicon oil and the like are preferred. The gas can be any optional gases such as air, an inert gas ($N_2$, etc.) and the like, and air is used typically. When the self-metabolic functional particles are dispersed in a liquid, the obtained functional fluid is a sol or a colloidal solution. A colloidal solution is stable for a long period of time and no particle is precipitated or condensed therein. As a method for preparing the colloidal solution, the wet synthetic method for preparing fine particles or the grinding method is mainly employed. Large size particles are finally removed from the obtained colloidal solution by a centrifugation or, in a case of a magnetic colloidal solution, by a magnetic purification, thereby obtaining a stable colloidal solution.

When the self-metabolic functional particles are dispersed in a gas, the obtained functional fluid is flowing fine particles, i.e. an aerosol. The aerosol herein includes, for example, powders (i.e., fine particles) containing a large amount of a gas and having a fluidity. The sol and the aerosol do not have as much fluidity as the colloidal solution. However, they can largely flow by magnetism, vibration and the like. The "dispersion" of the particles herein includes a dispersion at a level of molecules. For example, a dissolution of a material forming particles in a liquid is included. As the functional fluid, a colloidal solution or an aerosol is preferable. The fluidity of the self-metabolic functional particles is increased by dissolving or dispersing properly the self-metabolic functional particles in a fluid.

When the functional fluid is a colloidal solution, a surfactant can be added to improve the dispersibility of the particles. Any of the generally used surfactants, for example, carboxylic acids such as oleic acid and linoleic acid; amines; and a cationic or nonionic surfactant can be used.

When the particle containing the chemically reactive ferromagnetic component is a superfine particle of a ferromagnetic metal oxide, a metal ion or a hydroxy group is exposed on the surface of the superfine particles. Also in the case where the superfine particle is made of a magnetic metal, the surface thereof is oxidized as that of a metal oxide. When a surfactant is added in a functional fluid containing such particles, the metal ion and/or the hydroxy group on each of the particles chemically adsorbs (i.e., ionically bonded) to a functional group such as carboxylic group, amino group, etc. in the surfactant. Therefore, the surface of the self-metabolic functional particle is coated with the surfactant, forming a micelle in the fluid. Accordingly, the particles can be well dispersed in the fluid, and the stability of the resulting colloidal solution is excellent.

A preferred example of the functional fluid (ferromagnetic fluid) including the chemically reactive ferromagnetic component is a deodorant magnetic fluid. In this magnetic fluid, superfine particles of the chemically reactive ferromagnetic component (which also has a deodorizing function as well as ferromagnetism) are colloidally dispersed in a liquid, a disperse medium, preferably containing a surfactant. The superfine particle of the chemically reactive ferromagnetic component has a particle size of 5 to 100 nm, a large surface area, and a high surface activity due to an active thermal motion of superfine particle surfaces. Therefore, the magnetic fluid exhibits extremely excellent deodorizing properties such as a high deodorizing rate on the surface of the particle and a saturated deodorizing amount. Examples of the chemically reactive ferromagnetic component include the above-mentioned ferromagnetic components, among which ferrite is preferable, magnetite is more preferable and oxygen-defective magnetite is the most preferable. A compound containing a transition metal ion such as ferrite has a deodorizing activity possessed by the transition metal ion. Among the transition metal ions, $Fe^{2+}$ has a high deodorizing activity. In addition, the transition metal ion has an antibacterial action to prevent bacteria from proliferating and can also remove an odor.

The chemically reactive ferromagnetic superfine particle has deodorization mainly based on the following two redox reactions: A catalytic deodorization with a metal oxide on the surface of the superfine particle (a deodorization by a reversible redox reaction); and a deodorization by oxidizing or reducing the superfine particles themselves (a deodorization by irreversible reaction). These two reactions are competitively caused, and the mechanisms thereof depend upon the materials of the particles, the environmental condition at a time of deodorization, and the odorous component. The catalytic deodorization depends upon the reversible reactivity of the redox reaction of a metal oxide, and it does not have long-lasting complete reversibility. Therefore, the superfine particles gradually lose the activity thereof, and the loss is exhibited as a catalytic degradation.

The chemically reactive ferromagnetic superfine particles further have a deodorizing function by a metal chelate formation reaction. Since the surface of the chemically reactive ferromagnetic superfine particle has an active ionic site, for example, quaternary ammonium salt is produced at this site by forming a salt with ammonia or amines. When ammonia is incorporated Into a metal site, an ammine complex ion $M^{n+}(NH_3)_m$ is produced. Therefore, the chemically reactive ferromagnetic superfine particle also has an ability to adsorb odorous molecules.

As the surfactant of the deodorant magnetic fluid, any of the above-mentioned surfactants can be used. The ones containing carboxylic acid, sulfonic acid or the salts thereof for adsorbing odorous molecules are suitable. An attention should be paid to the vapor pressure of any fluid in which the self-metabolic functional particles are dispersed. It is necessary to select a nonvolatile fluid. As the fluid, water and paraffin oil are preferable, and water is more preferable. In using water, it is easy to keep a constant amount of water because adsorption of moisture from air to the colloidal solution and a volatile from the colloidal solution are equilibrated.

The deodorant magnetic fluid can further include, as a deodorant material, L-ascorbic acid or organic metal compounds such as transition metal phthalocyanine carboxylic acid, transition metal phthalooyanine sulfonic acid and the salts thereof, transition metal porphyrin derivative and the like. Such materials are dissolved or dispersed in a fluid. In this case, further higher deodorizing activity can be attained because such materials themselves have a great deodorization property. For example, L-ascorbic acid; end organic metal compounds such as transition metal phthalocyanine carboxylic acids (e.g., iron phthalocyanine octacarboxylic acid), transition metal phthalocyanine sulfonic acid and their salts can achieve deodorization by their catalytic or adsorption functions. The materials can be dissolved in a liquid together with a surfactant to coat the chemically reactive ferromagnetic superfine particles with the surfactant, thereby forming a micelle of the superfine particles. A transition metal porphyrin derivative, especially a transition metal phthalocyanine derivative can achieve deodorization by the catalytic function as mentioned above. Therefore, a combination of colloids of the chemically reactive ferromagnetic superfine particles and colloids of these compounds can be used. The organic metal compound having a carboxy group, an amino group, a hydroxyl group, an amido group, a sulfonic group and the like has an affinity for the water-soluble disperse medium and can be dissolved therein.

An antibacterial action can be conferred to the self-metabolic functional material by adding a phenol-type surfactant. It is also possible to mask the self-metabolic functional material by adding a surfactant with perfume.

In a second self-metabolic functional material according to the present invention, the indicator for detecting degradation or loss of the desired function its the electrically chargeable property. An electrically charged component herein gradually loses its electric charge with time when the material is kept under a predetermined condition, end preferably it loses its electric charge by adsorption or a chemical reaction.

As for the adsorption, moisture adsorption, medium adsorption, gas adsorption and the like are included. Examples of a component to lose its electric charge by the moisture adsorption include silica gel, $P_2O_5$, CaO, deliquescent materials and hydroscopic polymers, and those by the gas adsorption include porous particles made of metal oxide such as alumina and silica.

The chemical reaction is at least one reaction selected from the group consisting of a decomposition reaction, a redox reaction, a ring-opening reaction, a depolymerization reaction and a charge transfer reaction, and preferably is an ion generating reaction for generating an ionic conductive material. The reactions included in the above-mentioned group are caused by at least one stimulation selected from stimulations existing around the functional fluid such as light, heat, electricity and other reactive molecules around the functional material. Examples of the chemical reaction include the following reactions: A reaction for generating quaternary ammonium salt from an amine and an acid; a light ring-opening reaction of a chromic material; a hydrolyric reaction of a condensed molecule such as polyamide and polyester; a decomposition reaction by oxygen, heat or light; a depolymerization reaction of a polycondensation polymer; a charge-transfer complex generating reaction between an electron acceptor and an electron donor; and a betain (which is an ampho-ion) generating reaction of an amino acid and the like. An ion of the ionic conductive material generated by any of these reactions is at least one selected from the group consisting of proton, organonitrogen ions, organooxygen ions, organosulfur ions and halogen ions.

The self-metabolic functional particle is preferably an electrically chargeable insulated particle comprising the above-mentioned material. Even if the self-metabolic functional particle is a conductive particle, it has an attractive force by static electricity due to an induced polarization in the particle. However, in this case, the attractive force is weaker than that of the electrically chargeable insulated particle. The chargeable insulated particle is generally unipolarly charged either positively or negatively. On the other hand, the conductive particle has both positive and negative charges because it is charged by the induced polarization caused by a charge separation. In using the conductive particle, a particle chain is frequently formed in static electric field. Therefore, the second self-metabolic functional material can effectively conduct an attraction by static electricity by using the electrically chargeable insulated particle.

A function of the functional component is preferably one kind selected from a chromic function, a catalytic function, an adsorption function, a luminescence function and a wavelength conversion function, all of which are exhibited in response to various stimulations. The examples are the same as those of the first self-metabolic functional material.

The particle of the self-metabolic functional material of the present invention comprising the chargeable component and the functional component (i.e., the self-metabolic functional particle) can be made of a single material or a combination of two or more materials. In combining two or more materials, various materials can be used. For example, et least one of the above-mentioned materials as the functional material; and any of the materials with the chargeable property as the indicator for showing the degradation or loss of the function are respectively selected to form the self-metabolic functional particles with a desired function. The self-metabolic functional particles can be prepared by forming particles after mixing an electrically chargeable material and a functional material or by using particles made of a complex material comprising a chargeable material and a functional material.

As is in the first self-metabolic functional material, a smaller particle size of the second self-metabolic functional particles is more suitable, and a particle size of 100 $\mu$m or less is preferable. As the particle size of the self-metabolic functional particle becomes smaller, the fluidity of a sol, an aerosol or a colloidal solution becomes higher. Therefore, the sol, the aerosol, and the colloidal solution can easily flow by electric charge.

In the second self-metabolic functional material according to the present invention, the fluid in which the self-metabolic functional particles are dispersed is a dielectric liquid or a dielectric gas. Examples of the dielectric liquid include any optional dielectric liquids such as an organic solvent, oil and the like, and a high insulating liquid is preferred. Examples of the dielectric gas include any optional dielectric gasses such as air and an inert gas, and air is used most typically. When the self-metabolic functional particles are dispersed in the dielectric liquid, the functional liquid is a sol or a colloidal solution. On the other hand, when the self-metabolic functional particles are dispersed in the dielectric gas, the functional fluid (chargeable fluid) is fluidized powder, i.e., an aerosol. As the functional fluid, the colloidal solution or the aerosol is preferred.

In the second self-metabolic functional material of the present invention, the chargeable component of the self-metabolic functional particle loses its electric charge (becomes more conductive) in the dielectric gas or liquid with time when kept for a predetermined period of time (i.e., when kept under a predetermined condition for a predetermined period of time), thereby weakening the attractive force by static electricity of the particle. The decrease in the attractive force of the particle contributes to its self-metabolic property.

The first or the second self-metabolic functional material is used in a suitable apparatus. For example, a self-metabolic functional apparatus according to the present invention comprising a carrying means for carrying the self-metabolic functional material by magnetism or static electricity, a tank for containing the material, and a supply means for carrying the material in The tank by magnetism or static electricity and supplying the material to the carrying means can be used.

Examples of the carrying means with magnetism include magnets such as a solid magnet; a magnet roll; a magnet belt; a hollow magnet; fluid permeable magnets such as a porous magnetic substance, a honeycomb-like magnetic substance, a felt-like magnetic substance, a magnetic metal net; electromagnets such as a solid electromagnet, an electromagnet roll, and an electromagnet belt. When the self-metabolic functional material is a deodorant magnetic fluid, the fluid permeable magnet is preferable as the carrying means by magnetism. Examples of the carrying means by static electricity (i.e., electric charge) include an electrode, a charged belt, an electrode plate and the like. Since the carrying means uses magnetism or static electricity, the amount of the carried particles can be easily controlled by the force of the magnetism or static electricity.

It is also possible to use a carrier made of iron particles mixed with self-metabolic functional particles to give electric charge to the self-metabolic functional particles by friction. This carrier can be carried by a magnet by magnetism.

The second self-metabolic functional material has a characteristic that the self-metabolic functional particles contained therein can be charged as the material itself flows, since charge can be caused by friction between the particles or between the particle and the carrier. When the charged particles are allowed to stand, charge decay can be caused little by little. At this point, it As possible to compensate the decay by frictional charging by the flow of the particles.

The apparatus has preferably a structure in which an electromagnetic force that can be easily electrically controlled is used in at least one of the carrying means, the supply means and the stimulation means. This structure enables a self-metabolic functional apparatus which can effectively maintain a desired function without any complicated operation.

An example of such a self-metabolic functional apparatus will now be described referring to the accompanying drawings. For example, an apparatus of FIG. 1 has a tubular structure in almost a T shape having an inlet 51 and an outlet 52. A carrying means 2 for carrying self-metabolic functional particles 10 is provided in almost the center of a passage 50. A tank 4 for containing a functional fluid 1 is disposed at the bottom of the T-shaped part of the apparatus. A supply means 3 for supplying the functional fluid 1 comprising the self-metabolic functional particles 10 from the tank 4 to the carrying means 2 is disposed between the tank 4 and the carrying means 2. For example, when the self-metabolic functional material is the self-metabolic functional particles 10 having ferromagnetism due to a chemically reactive ferromagnetic component included therein, a magnet 2A and a magnetic belt 3A are used as the carrying means 2 and the supply means 3, respectively. The magnetic belt 3A is rotated, for example, in the direction of arrows indicated in the drawing to carry the self-metabolic functional particles 10 in the functional fluid 1 contained in the tank 4, thereby conveying the particles to the magnet 2A. For example, when the functional fluid 1 is an aerosol of the self-metabolic functional particles 10 containing a chemically reactive ferromagnetic component, the self-metabolic functional particles 10 are carried on the magnet 2A. The amount of the self-metabolic functional particles 10 carried on the magnet 2A depends upon the magnetic force of the magnet 2A.

When the function of the self-metabolic functional particles 10 is deodorization of a gas, air containing a gas including an odorous component such as hydrogen bromide and ammonia is introduced into the apparatus through the inlet 51. The odorized gas comes in contact with the self-metabolic functional particles 10 carried on the magnet 2A, thereby being deodorized by a chemical reaction or adsorption. The self-metabolic functional particles 10 gradually lose their ferromagnetism due to oxidation by air or a reaction of the ferromagnetic component with the odorous component. When the ferromagnetism of the particles 10 is lowered below a determined level or lost, the self-metabolic functional particles 10 can not be carried on the magnet 2A, thereby dropping into the tank 4. Next, only fresh self-metabolic functional particles 10 having ferromagnetism and the desired function are conveyed from the tank 4 by the magnetic belt 3A to be supplied to the magnet 2A. The deodorizing activity of the apparatus can be improved by heating the magnet 2A or the entire apparatus. It is preferred to design the apparatus so that the time required for the ferromagnetism of the chemically reactive ferromagnetic component to degrade below the determined level is almost the same as the time required for the desired function such as deodorization to degrade below a determined level. The magnet 2A can be an electromagnet 2C, in which case a terminal 7 is provided as shown in FIG. 1.

In the apparatus with the above-mentioned structure, when the self-metabolic functional particles 10 comprising an electrically chargeable component is used, an electrode 2B and a charged belt 3B are employed as the carrying means 2 and the supply means 3, respectively. The charged belt 3B is, for example, rotated in the direction of arrows indicated in the drawing to carry the electrically charged self-metabolic functional particles 10 in the functional fluid 1 contained in The tank 4 by static electricity. The self-metabolic functional particles 10 are thus conveyed to the electrode 2B. The conveyed self-metabolic junctional particles 10 are carried on the electrode 2B. As is in the case of the self-metabolic functional particles 10 containing the chemically reactive ferromagnetic component, the charge of the particles is decreased when the desired function such as deodorization is attained. When the charge is lowered below a determined level or lost, the self-metabolic functional particles 10 can not be carried on the electrode 2B, thereby dropping into the tank 4. Next, as described above, only fresh self-metabolic functional particles 10 having an electric charge and the desired function are conveyed to the electrode 2B by the charged belt 3B. It is preferred to design the apparatus so that the time required for the chargeable component to degrade the electric charge below the determined level (lose) is almost the same as the time required for the desired function such as deodorization to degrade to the determined level. In this manner, an apparatus which can achieve a desired function such as deodorization for a long period of time can be provided.

In the apparatus of FIG. 1, the supply means 3 conveys the self-metabolic functional particles 10 to the carrying means 2. However, another type of an apparatus without such a supply means can be used. For example, in an apparatus of FIG. 2, the carrying means 2 is a magnet roll 2D. By slightly vibrating the magnet roll 2D, the self-metabolic functional particles 10 including the chemically reactive ferromagnetic component are attached to the magnet roll 2D by magnetism, thereby gradually moving upward. The self-metabolic functional particles 10 whose magnetism is too degraded to be carried on the magnet roll 2D drop into the tank 4.

Furthermore, still another type of an apparatus which does not employ such a belt-like supply means as that of FIG. 1 can be used. For example, in an apparatus of FIG. 4, a bar-like magnet 9 as the supply means 3 is provided. The magnet 9 can supply the functional fluid 1 comprising the self-metabolic functional particles 10 to a magnet 22. The functional fluid 1 comprising the self-metabolic junctional particles 10 in the tank 4 (in this case, the fluid is a colloidal solution or a sol) is carried on the magnet 9 by magnetism to go up along the outer wall of the magnet 9, reaching and being carried on the magnet 22. When, for example, air including odorous molecules is introduced into the apparatus through the inlet 51, the air comes in contact with the functional fluid 1 comprising the self-metabolic functional particles 10 carried on the magnet 22 and the upper portion of the magnet 9, thereby being deodorized. When the apparatus is used for a predetermined period of time, the ferromagnetism of the self-metabolic functional particles 10 in the functional fluid 1 is degraded, and the self-metabolic functional particles 10 drop into the tank 4.

Figure 5:
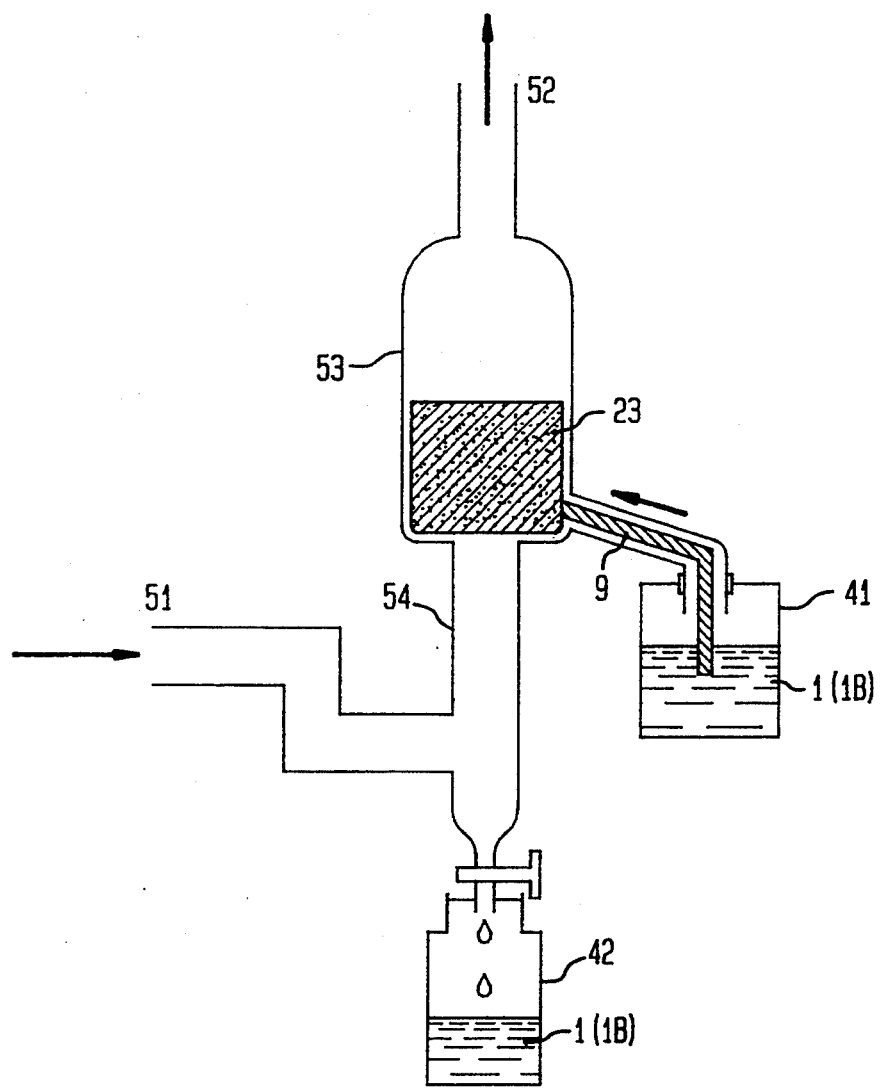
FIG. 5 is a schematic view of another example of a self-metabolic functional apparatus having deodorizing function-and including a self-metabolic functional material of the present invention.

Additionally, still another type of an apparatus according to the present invention as shown in FIG. 5 can be used. This apparatus comprises a carrying means container 53 for containing magnet 23 in a porous block form as the carrying means; a supply magnet 9 in a bar-like form for supplying a functional fluid 1 comprising self-metabolic functional particles 10 contained in a supply tank 41, the supply magnet 9 being connected to the carrying means container 53; a communicating vessel 54 extending downward from an opening at the bottom of the carrying means container 531 a spent fluid tank 42 provided under the communicating vessel 54, an inlet 51 for introducing a fluid into the communicating vessel 54, and an outlet 52 provided above the carrying means container 53.

Deodorization of air including an odorous component by using this apparatus will now be described. The magnet 23, as the carrying means, is contained in the carrying means container 53. The magnet 23 can be, for example, a porous block made of a polymer comprising magnetic superfine particles. The functional fluid 1 comprising the self-metabolic functional particles 10 including the chemically reactive ferromagnetic component is contained in the supply tank 41. The functional fluid 1 comprising the self-metabolic functional particles 10 is carried on the magnet 9 and raised along the surface of the magnet 9 to reach the carrying means container 53 in which the functional fluid 1 comprising the self-metabolic functional particles 10 is carried on the magnet 23. Air including an odorous component is introduced from the inlet 51 through the communicating vessel 54 end exhausted through the outlet 52 above the carrying means container 53. As the deodorization proceeds, the functional fluid 1 comprising the self-metabolic functional particles 10 with degraded ferromagnetic and deodorizing properties can not be carried on the magnet 23, thereby coming into the spent fluid tank 42 through the opening at the bottom of the carrying means container 53. Then, fresh functional fluid 1 including self-metabolic functional particles 10 by ferromagnetic end deodorizing properties are supplied from the supply tank 41 into the carrying means container 53 by the magnet 9. In this manner, a continuous deodorization is achieved for a long period of time.

In the foregoing description, the examples of deodorization using a self-metabolic functional apparatus according to the present invention are mentioned. Other functions such as a chromic function, a catalytic function, an adsorption function, an ion exchange function, a luminescence function and a wavelength conversion function also can be achieved according to the present invention. For example, an aerosol including self-metabolic functional particles comprising amine (such as polyvinyl benzylamine) as both the chargeable component and the functional component can be used as the self-metabolic functional material in the apparatus of FIG. 1. In this case, the amine adsorbs an acidic odorous material to generate quaternary ammonium salt, thereby performing deodorization. Alternatively, the apparatus of FIG. 3 can be used by using an aerosol including self-metabolic functional particles comprising polyamide for causing an ionization reaction by degradation due to oxygen, heat, light or the like as the chargeable component, and a photochromic pigment made of spirooxazine as the chromic functional component.

The self-metabolic functional material according to the present invention has a desired function such as a chromic function, a catalytic function, an adsorption function and the like, and gradually loses its function by being used. The degradation or loss of the function of the material can be detected by a determined indicator (such as degradation or loss of ferromagnetism or electric charge). By using such a material in the self-metabolic functional apparatus according to the present invention comprising a carrying means and a supply means, the self-metabolic functional material of the present invention is self-metabolized as follows: The function of the functional component contained in the self-metabolic functional material is degraded or lost, and at the same time the ferromagnetism or the electric charge is degraded or lost; and then the self-metabolic functional particles can not be carried on the carrying means. Fresh self-metabolic functional material comprising self-metabolic functional particles by either ferromagnetism or electric charge, and functionality, is carried on the carrying means by the supply means. Therefore, the present invention provides a self-metabolic functional apparatus which can achieve a function continuously for a long period of time by using a self-metabolic functional material.

The present invention will now be described by way of the examples.

EXAMPLE 1

Oxygen-defect magnetite having an average particle size of 300 nm was used as a chemically reactive ferromagnetic component. Fine particles of cobalt phthalocyanine tetrasulfonic acid having an average particle size of 200 nm were used as a functional component for deodorization by a catalytic and an adsorption functions. The magnetite and the cobalt phthalocyanine tetrasulfonic acid were mixed in the weight ratio of 1:1. The obtained mixture was then kneaded with adhesive polyester as a binder and ground. In this manner, self-metabolic functional particles having an average particle size of 15 μm and a saturated magnetization of 630 gauss were prepared. An aerosol as a functional fluid was prepared by dispersing the self-metabolic functional particles in air.

A self-metabolic functional apparatus as is shown In FIG. 1 was readied for operation. The apparatus had a tubular structure in almost a T shape having an inlet 51 and an outlet 52. A magnet *2a* for carrying the self-metabolic functional particles 10 was disposed approximately in the center of a passage 50. A tank 4 for containing a functional fluid 1 was disposed at the bottom of the T-shaped portion of the apparatus. A magnetic belt 3A for supplying the self-metabolic functional particles 10 to the magnet 2A was disposed between the magnet 2A end the tank 4. The magnet 2A end the magnetic belt 3A were magnetically connected. The lower end of the magnetic belt 3A was dipped in the functional fluid 1 in the tank 4. The self-metabolic functional particles 10 contained in the functional fluid 1 in the tank 4 were supplied to the magnet 2A by the magnetic belt 3A. In this example, a magnet made of a ferritic sintered substance was used as the magnet 2A. A magnetic rubber belt was used as the magnetic belt 3A. The aerosol 1A as the functional fluid 1 was put into the tank 4. The self-metabolic functional particles 10 in the aerosol 1A were carried on the magnetic belt 3A by magnetism and conveyed to the magnet 2A and carried on the magnet 2A by magnetism.

Air including 100 ppm of hydrogen sulfide as an odorous component was introduced into the apparatus through the inlet 51, allowed to come into contact with the magnet 2A carrying the self-metabolic functional particles 10, and then exhausted through the outlet The air was thus deodorized. The concentration of hydrogen sulfide of the exhausted air was measured by gas chromatography to obtain a result of 0.01 ppm or less.

Self-metabolic functional particles comprising only oxygen-defective magnetite, not cobalt phthalooyanine tetrasulfonic acid, were separately prepared. Another aerosol prepared from these particles was tested in the same manner as above to obtain a result of a hydrogen sulfide concentration of 110 ppm. Thus, the aerosol containing the self-metabolic functional particles comprising only oxygen-defective magnetite exhibited a comparatively satisfactory deodorizing activity. However, the aerosol containing the self-metabolic functional particles comprising both. oxygen-defective magnetite and cobalt phthalocyanine, tetrasulfonic acid showed a higher deodorizing activity.

When the air was allowed to flow through the apparatus for a long period of time, the self-metabolic functional particles 10 adsorbed the odorous component to lose the deodorizing property thereof by catalytically oxidizing the odorous component. At the same time, the self-metabolic functional particles 10 lost the ferromagnetism thereof due to a reaction between the oxygen-defective magnetite contained therein and oxygen. As a result, the self-metabolic functional particles 10 could not be carrier on the magnet 2A any more, and spontaneously dropped into the tank 4. Fresh self-metabolic functional particles 10, each particle having satisfactory deodorizing and ferromagnetic properties, were successively supplied from the tank 4 to the magnet 2A by being carried on the magnetic belt 3A by magnetism. The newly supplied particles 10 were carried on the magnet 2A by magnetism. Therefore, the self-metabolic functional apparatus of this example could achieve a high-level deodorizing property for an extremely long period of time.

EXAMPLE 2

Oxygen-defect magnetite having an average particle size of 500 nm was used as a chemically reactive ferromagnetic component. Fine particles of silica gel having an average particle size of 2000 nm were used as a functional component for drying by an adsorption function. The magnetite and the silica gel were mixed in the weight ratio of 1:4. The obtained mixture was then kneaded with modified nylon as a binder and granulated. Self-metabolic functional particles having an average particle size of 50 μm and a saturated magnetization of 150 gauss were prepared in this manner. An aerosol as a functional fluid was prepared by dispersing the self-metabolic functional particles in air.

As is in Example 1, the self-metabolic functional apparatus shown in FIG. 1 was used. An aerosol 1A was put into the tank 4. The self-metabolic functional particles 10 in the aerosol 1A were carried on the magnetic belt 3A by magnetism and conveyed to the magnet 2A end carried on the magnet 2A by magnetism.

Air with a relative humidity of 40% was introduced into the apparatus through the inlet 51 at an extremely slow rate. The air was then allowed to come into contact with the magnet 2A carrying the self-metabolic functional particles 10 and was exhausted through the outlet 52. In this manner, the air was dried. The relative humidity of the exhausted air was measured by a hydroscope to obtain a result of 15%.

When the air was allowed to flow through the apparatus for a long period of time, the self-metabolic functional particles 10 adsorbed moisture to lose the drying property thereof, and at the same time lost the ferromagnetism thereof due to a reaction between the oxygen-defective magnetite contained therein and oxygen. As a result, the self-metabolic functional particles 10 could not be carried on the magnet 2A any more and spontaneously dropped into the tank 4. Fresh self-metabolic functional particles 10, each particle having satisfactory drying and ferromagnetic properties, were successively supplied from the tank 4 to the magnet 2A by being carried on the magnetic belt 3A by magnetism and conveyed, and were carried on the magnet 2A by magnetism. Therefore, the self-metabolic functional apparatus of this example could achieve a high-level drying property by an adsorption function for an extremely long period of time.

EXAMPLE 3

Magnetite bearing a thin coat of a white pigment on a surface thereon and having an average particle size of 3000 nm was used as a chemically reactive ferromagnetic component. A photochromic pigment made of spiropyran was used as a functional component for a chromic function. The magnetite and the photochromic pigment were mixed in the weight ratio of 4:1. The obtained mixture was then kneaded with polyvinyl burytal as a binder and granulated. Self-metabolic functional particles with an average particle diameter of 30 μm and a saturated magnetization of 350 gauss were prepared in this manner. An aerosol as a functional fluid was prepared by dispersing the particles in air.

A self-metabolic functional apparatus as shown in FIG. 3 was readied for operation. This apparatus had a tank 4 for containing an aerosol as functional fluid and a magnetic plate 21A for carrying the self-metabolic functional particles 10. A magnetic belt 3A For supplying the self-metabolic functional particles 10 from the tank 4 to the magnetic plate was provided between the tank 4 and the magnetic plate 21A. The magnetic belt 3A was magnetically connected to the magnetic plate 21A and disposed so that a lower portion thereof was dipped in the functional fluid in the tank 4.

The aerosol 1A was put into the tank 4. The self-metabolic functional particles 10 contained in the aerosol 1A were carried on the magnetic belt 3A by magnetism and conveyed to the magnetic plate 21A, and then carried on the magnetic plate 21A by magnetism.

A UV light irradiated the magnetic plate 21A as a target, thereby changing the color of the photochromic pigment contained in the self-metabolic functional particles 10 to be recorded and displayed. The changed color went back to the color before the irradiation by a visible light. After repeating the above operation many times, the self-metabolic functional particles 10 lost the chromic function thereof due to degradation of coloring property of the photochromic pigment and also lost the ferromagnetism thereof due to a reaction between the magnetite contained therein and oxygen. As a result, the self-metabolic functional particles 10 could not be carried on the magnetic plate 21A any more and spontaneously dropped into the tank 4. Fresh self-metabolic functional particles 10, each particle having satisfactory coloring and ferromagnetic properties, were successively supplied from the tank 4 to the magnetic plate 21A by being carried on the magnetic belt 3A by magnetism and conveyed, and carried on the magnetic plate 21A by magnetism. Therefore, the self-metabolic functional apparatus of this example could repeatedly record and display clear colored images for a long period of time and achieve a high-level coloring property without exhibiting the conventional degradation of the photochromic pigments due to the repetition.

EXAMPLE 4

Magnetite bearing a thin coat of a dye-adsorptive white pigment on a surface thereon and having an average particle size of 10 μm was used as a chemically reactive ferromagnetic component. A pigment for dye laser made from rhodamine 6G was adsorbed on the top surface of the magnetite as a functional component for a fluorescent function. Self-metabolic function particles with a saturated magnetization of 350 gauss were thus prepared. An aerosol as a functional fluid was prepared by dispersing the particles in air.

The self-metabolic functional apparatus of FIG. 3 was used as in Example 3. The aerosol 1A was put into the tank 4. The self-metabolic functional particles 10 contained in the aerosol 1A were carried on the magnetic belt 3A by magnetism and conveyed to the magnetic plate 21A, and then carried on the magnetic plate 21A by magnetism.

A XeCl excimer laser, as an excitation light, irradiated the magnetic plate 21A with micro-vibratory motion as a target to obtain a dye laser with a wavelength of 580 nm. When the XeCl excimer laser continuously irradiated for a long period of time, the self-metabolic functional particles 10 lost the luminescence property thereof due to degradation of the pigment, and at the same time lost the ferromagnetism thereof due to a reaction between the magnetite contained therein end oxygen. As a result, the self-metabolic functional particles 10 could not be carried on the magnetic plate 21A any more and spontaneously dropped into the tank 4. Fresh self-metabolic functional particles 10, each particle having satisfactory luminescence and ferromagnetic properties, were successively supplied from the tank 4 to the magnetic plate 21A by being carried on the magnetic belt 3A by magnetism and conveyed, and were carried on the magnetic plate 21A by magnetism. Therefore, the self-metabolic functional apparatus of this example could achieve a laser emittance for an extremely long period of time. No complicated circulating device for a dye laser pigment solution generally used for avoiding the degradation of the laser was required.

EXAMPLE 5

Self-metabolic functional particles with a saturated magnetization of 350 gauss were prepared by coating the surface of the magnetite of Example 4 with a second harmonic generating material as a functional component instead of the pigment. An aerosol was prepared by dispersing the particles in air.

Figure 3:
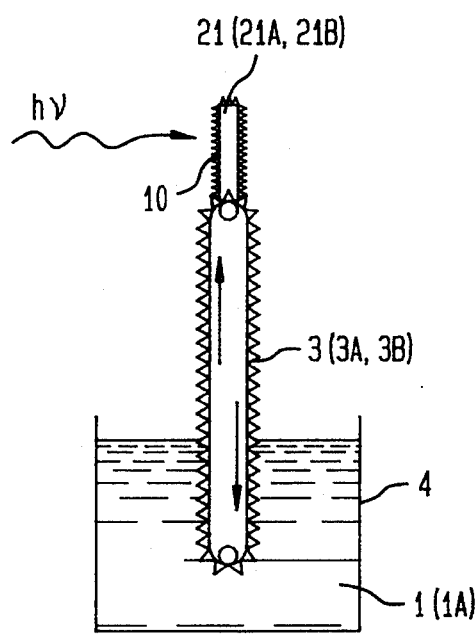
FIG. 3 is a schematic sectional view of an example of a self-metabolic functional apparatus including a self-metabolic functional material of the present invention, which exhibits its function by irradiation of light.

The self-metabolic functional apparatus of FIG. 3 was used as in Example 4. A Nd:YAG laser as an excitation light irradiated the magnetic plate 21A as a target to obtain a green second harmonic. When the Nd:YAG laser continuously irradiated for a long period of time, the self-metabolic functional particles 10 lost the luminescence property thereof due to degradation of the second harmonic generating material, and lost the ferromagnetism thereof due to a reaction between the magnetite and oxygen. As a result, self-metabolic functional particles 10 could not be carried on the magnetic plate 21A any more, and spontaneously dropped into the tank 4. Fresh self-metabolic functional particles 10, each particle having satisfactory luminescence and ferromagnetic properties, were successively supplied from the tank 4 to the magnetic plate 21A by being carried on the magnetic belt 3A by magnetism and conveyed, and were carried on the magnetic plate 21A by magnetism. Therefore, in the self-metabolic functional apparatus of this example, it was possible to generate a green second harmonic for an extremely long period of time.

EXAMPLE 6

Ion exchange resin with an average particle diameter of 5 μm containing 10% of active magnetite particles with an average particle size of 400 nm as a chemically reactive ferromagnetic component was prepared as self-metabolic functional particles. A sol as a functional fluid was prepared by immersing and dispersing the particles in water.

The sol comprising the self-metabolic functional particles was put into an ion exchange device for purifying the tap water, and the self-metabolic functional particles were allowed to be carried on a magnet disposed in the device. The tap water was then purified by the operation of the device. When the operation for purifying the tap water was continued for a long period of time, the sol containing the self-metabolic functional particles lost its ion exchange property and ferromagnetism due to a reaction between the active magnetite and oxygen in the water. As a result, the sol containing the self-metabolic functional particles could not be carried on the magnet any more. A fresh sol comprising self-metabolic functional particles, each particle having satisfactory ion exchange and ferromagnetic properties, were successively supplied from the water by being carried on the magnet by magnetism. Therefore, the ion exchange device using such a self-metabolic functional material could achieve a long-lived ion exchange property having a small load resistance of flowing water and a high ion exchange rate.

EXAMPLE 7

Polyvinyl benzylamine as a chargeable component which reduces an electric resistance by adsorbing an acid to produce quaternary ammonium salt was used as a functional component for deodorization by an adsorption function. The polyvinyl benzylamine and an adhesive polyamide were mixed and granulated to prepare self-metabolic functional particles with an average particle size of 15 μm. An aerosol as a functional fluid was prepared by dispersing the particles in air. The self-metabolic function particles were frictionally charged by mixing the aerosol with iron particles coated with a polyester and having an average diameter of 100 μm. The self-metabolic functional particles were positively charged and the iron particles negatively.

The self-metabolic functional apparatus of FIG. 1 was employed. In this example, a negative electrode 2B was used for carrying the self-metabolic functional particles 10. The magnetic belt 3A was used for supplying the self-metabolic functional particles 10. The aerosol 1A was put into the tank 4. The self-metabolic functional particles 10 contained in the aerosol 1A were carried on the magnetic belt 3A by magnetism and conveyed to the electrode 2B, and then carried on the electrode 2B by static electricity.

Air containing 100 ppm of an acidic odorous gas (a hydrogen chloride) was introduced into the apparatus through the inlet 51, allowed to come into contact with the electrode 2B carrying the self-metabolic functional particles 10 and then exhausted through the outlet 52. The odorous gas was deodorized in this manner.

When the air was allowed to flow through the apparatus for a long period of time, the self-metabolic functional particles 10 lost the deodorizing property thereof and electric charges thereof resulting from adsorbing the acidic odorous component to produce quaternary ammonium salt. As a result, the self-metabolic functional particles 10 could not be carried on the electrode 2B any more and spontaneously dropped into the tank 4. Fresh self-metabolic functional particles 10, each particle having satisfactory deodorizing property and sufficient electrical charge, were successively supplied from the tank 4 to the electrode 2B by being carried on the magnetic belt 3A by magnetism and conveyed, and were carried on the electrode 2B by static electricity. Therefore, the self-metabolic functional apparatus of this example could achieve a high-level deodorizing property for an extremely long period of time.

EXAMPLE 8

Nylon particles with an average particle size of 500 μm were used as self-metabolic functional particles with electric charges and a drying properly by an adsorption function. An aerosol as a functional fluid was prepared by dispersing the particles in air. The self-metabolic functional particles were positively charged by friction.

The self-metabolic functional apparatus of FIG. 1 was used. In this example, a negative electrode 2B was used for carrying the self-metabolic functional particles 10. The charged belt 3B was used for supplying the self-metabolic functional particles 10. The aerosol 10 was put into the tank 4. The self-metabolic functional particles 10 contained in the aerosol 1A were carried on the charged belt 3B by electric charge end conveyed to the electrode 2B, and then carried on the electrode 2B by static electricity.

Air with a relative humidity of 40% was introduced into the apparatus through the inlet 51 at an extremely low rate. The air was allowed to come into contact with the electrode 2B carrying the self-metabolic functional particles 10 and then was exhausted through the outlet 52. The air was dried in this manner. The relative humidity of the exhausted air was measured by a hydroscope to obtain a result of 15%.

When the air was allowed to flow through the apparatus for a long period of time, the self-metabolic functional particles 10 adsorbed moisture to lose the drying property and electric charges thereof. As a result, the self-metabolic functional particles 10 could not be carried on the electrode 2B any more and spontaneously dropped into the tank 4. Fresh self-metabolic functional particles 10, each particle having satisfactory drying property and sufficient electrical charge, were successively supplied from the tank 4 to the electrode 2B by being carried on the charged belt 3B by static electricity, and were carried on the electrode 2B by static electricity. Therefore, the self-metabolic functional apparatus of this example could achieve a high-level drying property by the adsorption function for an extremely long period of time.

EXAMPLE 9

Polyamide which could be easily decomposed to be ionized due to degradation with time by oxygen, heat or light was used as a chemically reactive chargeable component. A photochromic pigment made from spirooxazine was used as a functional component for a chromic function. The photochromic pigment was mixed with the polyamide as a binder to prepare self-metabolic functional particles. An aerosol as a functional fluid was prepared by dispersing the particles in air. The self-metabolic functional particles 10 were positively charged by friction.

The self-metabolic functional apparatus of FIG. 3 was employed. In this example, a negative transparent electrode plate 21B was used for carrying the self-metabolic functional particles 10. A charged belt 3B was used for supplying the self-metabolic functional particles 10. The aerosol 1A was put into the tank 4. The self-metabolic functional particles 10 were carried on the charged belt 3B by static electricity end conveyed to the electrode plate 21B, end were then carried on the electrode plate 21B by static electricity.

An image light irradiated the electrode plate 21B as a target, thereby changing the color of the photochromic pigment contained in the self-metabolic functional particles 10 carried thereon. The changed color went back immediately to the color before the irradiation when stopping the irradiation because spirooxazine had a high rate for a decoloring reaction. After repeating the above operation many times, the self-metabolic functional particles 10 lost the chromic function thereof due to degradation of the coloring property of the photochromic pigment and also lost the electric charges thereof due to the ionization reaction by decomposition. As a result, the self-metabolic functional particles 10 could not be carried on the electrode plate 21B any more and spontaneously dropped into the tank 4. Fresh self-metabolic functional particles 10, each particle having satisfactory coloring property and sufficient electrical charge, were successively supplied from the tank 4 to the electrode plate 21B by being carried on the charged belt 3B by static electricity and conveyed, and were carried on the electrode plate 21B by static electricity. Therefore, the self-metabolic functional apparatus of this example could repeatedly record and display clear colored images for a long period of time and achieve a high-level coloring property without exhibiting the conventional degradation of the photochromic pigments due to the repetition. Accordingly, the apparatus could be utilized as a light modulating plate and achieve a satisfactory chromic function.

EXAMPLE 10

Polyester which could be easily decomposed for ionization due to degradation with time by oxygen, heat or light was used as a chemically reactive chargeable component. A pigment for dye lasers made from rohdamine 6G was used as a functional component for a luminescence function. The pigment and the polyester were mixed to be dispersed to prepare self-metabolic functional particles. An aerosol as a functional fluid was prepared by dispersing the particles in air. The self-metabolic functional particles were negatively charged by friction.

The self-metabolic functional apparatus of FIG. 3 was employed. In this example, a white positive electrode plate 21B was used for carrying the self-metabolic functional particles 10. The charged belt 3B was used for supplying the self-metabolic functional particles 10. The aerosol 1A was put into the tank 4. The self-metabolic functional particles 10 in the aerosol 1A were carried on the charged belt 3B by static electricity and conveyed to the electrode plate 21B, and then carried on the electrode plate 21B by static electricity.

A XeCl excimer laser light irradiated the electrode plate 21B with micro-vibratory motion as a target to obtain a dye laser light with a wavelength of 600 nm. When the XeCl excimer laser repeatedly irradiated for a long period of time, the self-metabolic functional particles 10 lost the luminescence property thereof due to degradation of the pigment and the electric charges thereof due to an ionization reaction by decomposition. As a result, the self-metabolic functional particles 10 could not be carried on the electrode plate 21B any more and spontaneously dropped into the tank 4. Fresh self-metabolic functional particles 10, each particle having satisfactory luminescence property and sufficient electrical charge, were successively supplied from the tank 4 to the electrode plate 21B by being carried on the charged belt 3B by static electricity and conveyed, and were carried on the electrode plate 21B by static electricity. Therefore, the self-metabolic functional apparatus could achieve a dye laser emittance for an extremely long period of time.

EXAMPLE 11

Organic crystalline particles which can generate a second harmonic were used as a functional component. Polyester which can be easily discomposed for ionization by degradation with time due to oxygen, heat and light was used as a chargeable component. The organic crystalline particles were thinly coated with a polyester to prepare self-metabolic functional particles. An aerosol as a functional fluid was prepared by dispersing the particles in air. The self-metabolic functional particles were negatively charged by friction.

The self-metabolic functional apparatus of FIG. 3 was employed as in Example 10. The aerosol 1A was put into the tank 4. The self-metabolic functional particles 10 contained in the aerosol 1A were carried on the charged belt 3B by static electricity and conveyed to the positive electrode plate 21B, and then carried on the electrode plate 21B by static electricity.

A Nd:YAG laser as an excitation light irradiated the electrode plate 21B with micro-vibratory motion as a target to obtain a green second harmonic. When the Nd:YAG laser continuously irradiated for a long period of time, the self-metabolic functional particles 10 lost the luminescence property of the organic crystalline particles and the electric charges thereof due to the ionization reaction by decomposition. As a result, the self-metabolic functional particles 10 could not be carried on the electrode plate 21B any more, and spontaneously dropped into the tank 4. Fresh self-metabolic functional particles 10, each particle having satisfactory luminescence property and sufficient electrical charge, were successively supplied from the tank 4 to the electrode plate 21B by being carried on the charged belt 3B by static electricity and conveyed, and were carried on the electrode plate 21B by static electricity. Therefore, in the self-metabolic functional apparatus of this example, it was possible to generate a green second harmonic for an extremely long period of time.

EXAMPLE 12

Polyester which can be easily decomposed due to degradation with time by oxygen, heat and light was used as a chemically reactive chargeable component. Fine particles of cobalt phthalocyanine tetrasulfonic acid with an average particle size of 200 nm were used as a functional component for deodorization by catalytic and adsorption functions. The polyester and the cobalt phthalocyanine tetrasulfonio acid were mixed in the weight ratio of 1:2. The obtained mixture was then kneaded and ground. Self-metabolic functional particles with an average particle size of 20 $\mu$m were prepared in this manner. An aerosol as a functional fluid was prepared by dispersing the particles in air. The self-metabolic functional particles 10 were frictionally charged by mixing the aerosol 1A with iron particles coated with a polyester. The self-metabolic functional particles were negatively charged and the iron particles positively charged.

The self-metabolic functional apparatus of FIG. 1 was employed. In this example, a positive electrode 2B was used for carrying the self-metabolic functional particles 10. The magnetic belt 3A was used for supplying the self-metabolic functional particles 10. The aerosol 1A was put into the tank 4. The self-metabolic functional particles 10 contained in the aerosol 1A were carried on the magnetic belt 3A by magnetism and conveyed to the electrode 2B, and then carried on the electrode 2B by static electricity.

Air containing an odorous gas (100 ppm of hydrogen sulfide and 100 ppm of trimethyl amine) was introduced into the apparatus through the inlet allowed to come into contact with the electrode 2B carrying the self-metabolic functional particles 10 and exhausted through the outlet 52. The air was deodorized by adsorption and catalytic oxidization. The concentration of hydrogen sulfide of the exhausted air was measured by gas chromatography to obtain a result of 0.01 ppm or less.

When the air was allowed to flow through the apparatus for a long period of time, the self-metabolic functional particles 10 lost the deodorizing property thereof by adsorption and catalytic organization and the electric charges thereof by the decomposition reaction. As a result, the self-metabolic functional particles 10 could not be carried on the electrode 2B any more and spontaneously dropped into the tank 4. Fresh self-metabolic functional particles 10, each particle having satisfactory deodorizing property and sufficient electrical charge, were successively supplied from the tank 4 to the electrode 2B by being carried on the magnetic belt 3A by magnetism and conveyed, and were carried on the electrode 2B by static electricity. Therefore, in the self-metabolic functional apparatus of this example, it was possible to achieve a high-level deodorizing property by adsorption and catalytic functions for an extremely long period of time.

EXAMPLE 13

Oxygen-defect magnetite with an average particle size of 30 nm was colloidally dispersed in a paraffin oil using a higher fatty acid as a surfactant, thereby obtaining a deodorant magnetic fluid as a functional fluid in which self-metabolic functional particles with a saturated magnetization of 300 gauss were dispersed.

A self-metabolic functional apparatus as shown in FIG. 5 was readied for operation. This apparatus comprised porous block magnet 23 for carrying a magnetic fluid 1B comprising the self-metabolic functional particles 10, a container carrying means 53 for containing the magnet 23, a supply magnet 9 for supplying the magnetic fluid 1B comprising the self-metabolic functional particles 10 in a supply tank 41 to the carrying means container 53, the supply magnet 9 being connected to the carrying means container 53, a communicating vessel 54 extending downward from an opening at the bottom of the carrying means container 53, a spent fluid tank 42 for containing the spent magnetic fluid 1B disposed under the communicating vessel 54, an inlet 51 for introducing a fluid into the communicating vessel 54, and an outlet 52 disposed above the carrying means container 53 for exhausting the fluid. In this example, a porous magnet was used as the magnet 23. A bar-like magnetic rubber was used as the supply magnet 9. The magnetic fluid 1B was put into the tank 41. The magnetic fluid 1B comprising the self-metabolic functional particles 10 was directed to go up along the supply magnet 9 from the supply tank 41 by magnetism to the magnet 23, and then carried on the magnet 23 by magnetism.

Air containing 150 ppm of ammonia as an odorous component was introduced into the apparatus through the inlet 51, allowed to come into contact with the magnet 23 carrying the magnetic fluid 1B containing the self-metabolic functional particles 10, and exhausted through the outlet 52. The air was thus deodorized. The concentration of ammonia in the exhausted air was measured by gas chromatography to obtain a result of 0.1 ppm or less.

Before allowing the air containing the odorous component to flow through the apparatus, the magnetic fluid 1B comprising the self-metabolic functional particles 10 did not flow down into the spent fluid tank 42. When the air was allowed to flow through the apparatus for a long period of time, the self-metabolic functional particles 10 lost the deodorizing property thereof against the odorous component and the ferromagnetism thereof due to a reaction between the oxygen-defective magnetite and oxygen. As a result, the magnetic fluid 1B comprising the self-metabolic functional particles 10 could not be carried on the magnet 23 any more, and spontaneously flowed down into the spent fluid tank 42. A fresh magnetic fluid 1B comprising self-metabolic functional particles 10, each particle having satisfactory deodorizing and ferromagnetic properties, were supplied from the supply tank 41 to the magnet 23 by the supply magnet 9 by magnetism, and then carried on the magnet 23 by magnetism. Therefore, the self-metabolic functional apparatus could achieve a high level deodorizing property for an extremely long period of time.

EXAMPLE 14

Magnetite with an average particle size of 35 nm which had been successively treated with a higher fatty acid and an anionic surfactant, and iron phthalocyanine octacarboxylic acid were colloidally dispersed in water, thereby obtaining a deodorant magnetic fluid as a functional fluid in which self-metabolic functional particles with a saturated magnetization of 250 gauss were dispersed.

Figure 4:
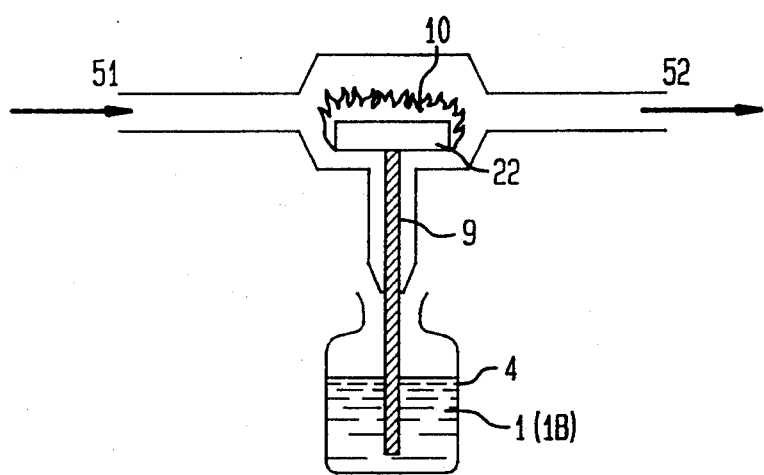
FIG. 4 is a schematic sectional view of an example of a self-metabolic functional apparatus having a deodorizing function and including a self-metabolic functional material of the present invention.

A self-metabolic functional apparatus of FIG. 4 was readied for operation. This apparatus is identical to that shown in FIG. 1 except a bar-like magnet 9 is provided instead of the magnetic belt In this example, a ferrite sintered magnet and a bar-like magnetic rubber are used as a magnet 22 and the magnet 9, respectively. A magnetic fluid 1B containing the self-metabolic functional particles 10 was directed to go up along the magnet 9 from the tank 4 by magnetism to the magnet 22, and then carried on the magnet 22 by magnetism. The amount of the self-metabolic functional particles 10 carried on the magnet 22 depends upon a difference in height between the magnet 22 and the surface level of the magnetic fluid 1B in the tank 4. In this example, the magnet 22 was set 9.3 cm above the surface level of the magnetic fluid 1B in the tank 4.

Air including 100 ppm of hydrogen sulfide as an odorous component was introduced into the apparatus through the inlet 51 and allowed to come into contact with the magnet 22 carrying the magnetic fluid 1B comprising the self-metabolic functional particles 10, and then exhausted through the outlet 52. The concentration of hydrogen sulfide of the exhausted air was measured by gas chromatography to obtain a result of 0.01 ppm or less.

When the air was allowed to flow through the apparatus for a long period of time, the self-metabolic functional particles 10 lost the deodorizing property thereof against the odorous component and the ferromagnetism thereof due to a reaction between the magnetite contained therein and oxygen. As a result, the magnetic fluid 1B comprising the self-metabolic functional particles 10 could not be carried on the magnet 22 any more, and spontaneously flowed down into the tank 4. A fresh magnetic fluid 1B comprising the self-metabolic functional particles 10, each particle having satisfactory deodorizing and ferromagnetic properties, were supplied from the tank 4 to the magnet 22 by the magnet 9 by magnetism, and then carried on the magnet 22 by magnetism. Therefore, it was possible to achieve a high level deodorization for an extremely long period of time in this self-metabolic functional apparatus.

EXAMPLE 15

Manganese ferrite with an average particle size of 35 nm which had been successively treated with a higher fatty acid and an anionic surfactant, and cobalt phthalocyanine tetrasulfonio acid were colloidally dispersed in water, thereby preparing a deodorant magnetic fluid as a functional fluid in which self-metabolic functional particles with a saturated magnetization of 330 gauss were dispersed.

The self-metabolic functional apparatus of FIG. 1 was employed. In this example, an electromagnet 2C was used for carrying the self-metabolic functional particles 10. An electromagnetic belt 3C was used for supplying the self-metabolic functional particles 10. The magnetic fluid 1B was put into the tank 4. The magnetic fluid 1B comprising the self-metabolic functional particles 10 in the tank 4 was carried on the electromagnetic belt 3C by magnetism and conveyed to the electromagnet 2C, and then carried on the electromagnet 2C by magnetism.

In this example, since the self-metabolic functional particles 10 were carried on an electromagnet instead of a permanent magnet, an alternating voltage is applied to the electromagnet 2C via a terminal 7 to carry the magnetic fluid 1B comprising the self-metabolic functional particles 10 only when apparatus was switched on. The amount of the self-metabolic functional particles 10 to be carried on the electromagnet 2C depended upon the electromagnetic force of the electromagnet 2C and a difference in height between the electromagnet 2C and the surface level of the magnetic fluid 1B in the tank 4. In this example, the electromagnet 2C was set at a position 6 cm above the surface level of the magnetic fluid 1B in the tank 4, and the alternating voltage was adjusted to be 20 V.

Air containing 130 ppm of trimethyl amine as an odorous component was introduced into the apparatus through the inlet 51 and allowed to come into contact with the electromagnet 2C carrying the magnetic fluid 1B comprising the self-metabolic functional particles 10, and then exhausted through the outlet 52. The concentration of trimethyl amine of the exhausted air was measured by gas chromatography to obtain a result of 0.01 ppm or less.

When the apparatus was switched off, the electromagnet 2C lost its magnetism and the magnetic fluid 1B comprising the self-metabolic functional particles 10 flowed down into the tank 4. When the apparatus was switched on again, the magnetic fluid 1B was carried on the electromagnet 2C again. When the air was allowed to flow through the apparatus for a long period of time, the self-metabolic functional particles 10 lost the deodorizing property thereof against the odorous component and the ferromagnetism thereof due to a reaction between the manganese ferrite contained therein and oxygen. As a result, the magnetic fluid 1B comprising The self-metabolic functional particles 10 could not be carried on the electromagnet 2C any more, and spontaneously dropped into the tank 4. A fresh magnetic fluid 1B comprising self-metabolic functional particles 10, each particle having satisfactory deodorizing and ferromagnetic properties, were supplied from the tank 4 to the electromagnet 2C by being carried on the electromagnetic belt 3C by magnetism and conveyed, and then carried on the electromagnet 2C by magnetism. Therefore, this self-metabolic functional apparatus could achieve a high level deodorization for an extremely long period of time.

EXAMPLE 16

Magnetite with an average particle size of 30 nm which had been treated with a higher fatty acid, and iron phthalocyanine octacarboxylic acid was colloidally dispersed in a chlorinated ester oil with a specific gravity of 1.05, thereby preparing a deodorant magnetic fluid as a functional fluid in which self-metabolic functional particles with a saturated magnetization of 350 gauss were dispersed.

The self-metabolic functional apparatus of FIG. 4 was employed as in Example 14. A magnetic fluid 1B was put into the tank 4. The magnetic fluid 1B comprising the self-metabolic functional particles 10 was directed to go up along the magnet 9 from the tank 4 to the magnet 22 by magnetism, and then carried on the magnet 22 by magnetism.

Water including 100 ppm of hydrogen sulfide as an odorous component was introduced into the apparatus through the inlet 51, allowed to come into contact with the magnet 22 carrying the magnetic fluid 1B comprising the self-metabolic functional particles 10, and then exhausted through the outlet 52, thereby being deodorized. The magnetic fluid 1B comprising the self-metabolic functional particles 10 did not mix with water. The concentration of hydrogen sulfide of the exhausted water was measured by gas chromatography to obtain a result of 0.05 ppm or less.

When the water was allowed to flow through the apparatus for a long period of time, the self-metabolic functional particles 10 lost the deodorizing property thereof against the odorous component and the ferromagnetism thereof due to a reaction between the magnetite contained therein and oxygen. As a result, the magnetic fluid 1B comprising the self-metabolic functional particles 10 could not be carried on the magnet 22 any more, and spontaneously flowed down into the tank 4. A fresh magnetic fluid 1B comprising self-metabolic functional particles 10, each particle having satisfactory deodorizing and ferromagnetic properties, were supplied from the tank 4 to the magnet 22 by the supply magnet 9 by magnetism, and then carried on the magnet 22 by magnetism. Therefore, it was possible to achieve a high level deodorization for an extremely long period of time in this self-metabolic functional apparatus.

EXAMPLE 17

Self-metabolic functional particles with an average particle size of 30 μm and a saturated magnetization of 1600 gauss were prepared by mixing manganese ferrite with an average particle size of 70 nm and denatured nylon as a binder and granulating the mixture. A deodorant aerosol as a functional fluid was prepared by dispersing the particles in air.

Figure 2:
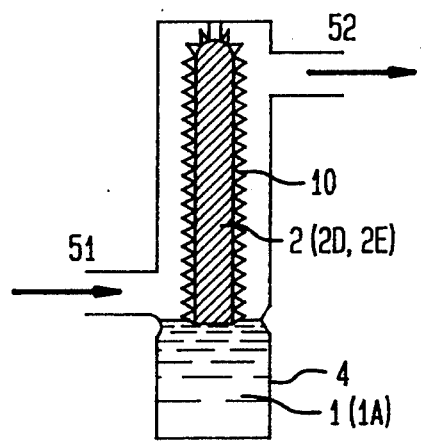
FIG. 2 is a schematic sectional view of another example of a self-metabolic functional apparatus including a self-metabolic functional material of the present invention.

A self-metabolic functional apparatus of FIG. 2 was readied for operation. This apparatus was in almost a cylindrical shape, and comprised a magnet roll 2D disposed in the center thereof, a tank 4 disposed at the bottom thereof. An inlet 51 and an outlet 52 were disposed on an upper portion and a lower portion thereof, respectively. The magnet roll 2D was fixed at the upper portion thereof so as to enable a slight vibration. The lower portion of the magnet roll 2D was disposed so as to be dipped in an aerosol 1A contained in the tank 4. The aerosol 1A was put into the tank 4. The magnet roll 2D was slightly vibrated, and thus the self-metabolic functional particles 10 contained in the aerosol 1A were carried on the entire magnet roll 2D from the tank 4 by magnetism.

Air including 100 ppm of ammonia as an odorous component was introduced into the apparatus through the inlet 51, allowed to come into contact with the magnet roll 2D carrying the self-metabolic functional particles 10 and then exhausted through the outlet 52. The concentration of ammonia of the exhausted air was measured by gas chromatography to obtain a result of 0.1 ppm or less. When the air was allowed to flow through the apparatus for a long period of time, the self-metabolic functional particles 10 lost the deodorizing property thereof against the odorous component and the ferromagnetism thereof due to a reaction between the magnetite contained therein and oxygen. As a result, the self-metabolic functional particles 10 could not be carried on the magnet roll 2D any more, and spontaneously dropped into the tank 4. A fresh aerosol 1A comprising self-metabolic functional particles, each particle having satisfactory deodorizing and. ferromagnetic properties, were supplied from the tank 4 to the magnet roll 2D by the slight vibration thereof and magnetism, and then carried on the entire magnet roll 2D by magnetism. Therefore, it was possible to achieve a high level deodorization for an extremely long period of time in this self-metabolic functional apparatus.

EXAMPLE 18

Self-metabolic functional particles with an average particle size of 10 μm and a saturated magnetization of 1550 gauss were prepared by mixing manganese ferrite with an average particle size of 55 nm, silica particles with an average particle size of 50 nm on which iron phthalocyanine octacarboxylic acid was adsorbed, and polyvinyl alcohol as a binder and granulating the mixture. A deodorant aerosol as a functional fluid was prepared by dispersing the particles in air.

The self-metabolic functional apparatus of FIG. 2 was readied for operation. In this example, an electromagnet roll 2E which could be slightly vibrated was used for carrying the self-metabolic functional particles 10. The aerosol 1A was put into the tank 4. The electromagnet roll 2E was slightly vibrated, and thus the self-metabolic functional particles 10 contained in the aerosol 1A were carried on the entire electromagnet roll 2E from the tank 4 by magnetism this example, the self-metabolic functional particles 10 were carried on an electromagnet instead of a permanent magnet. Therefore, only whale the apparatus was on, an alternating voltage was applied to the electromagnet roll 2E, thereby carrying the self-metabolic functional particles 10. The amount of the self-metabolic functional particles 10 carried on the electromagnet roll 2E depended upon the electromagnetic force of the electromagnet roll 2E. In this example, an alternating voltage was 25 V.

Air including 130 ppm of trimethyl amine as an odorous component was introduced into the apparatus through the inlet 51, allowed to come into contact with the electromagnet roll 2E carrying the self-metabolic functional particles 10 and then exhausted through the outlet 52. The concentration of trimethyl amine of the exhausted air was measured by gas chromatography to obtain a result of 0.1 ppm or less. Since the electromagnet lost its magnetism when the apparatus was switched off, the self-metabolic functional particles 10 flowed down into the tank 4. When the apparatus was switched on again, the self-metabolic functional particles 10 were again carried on the entire electromagnet roll 2E by the slight vibration thereof and the magnetism. When the air was allowed to flow through the apparatus for a long period of time, the self-metabolic functional particles 10 lost the deodorizing property thereof against the odorous component and the ferromagnetism thereof due to a reaction between the magnetite contained therein and oxygen. As a result, the aerosol 1A comprising the self-metabolic functional particles 10 could not be carried on the electromagnet roll 2E any more, and spontaneously dropped into the tank 4. A fresh aerosol 1A comprising self-metabolic functional particles 10, each particle having satisfactory deodorizing and ferromagnetic properties, were supplied from the tank 4 to the electromagnet roll 2E by the slight vibration thereof and magnetism, and then carried on the entire electromagnet roll 2E by magnetism. Therefore, it was possible to achieve a high level deodorization for an extremely long period of time in this self-metabolic functional apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What Is claimed is:

1. A self-metabolic functional material comprising functional ferromagnetic particles dispersed in a fluid, wherein each of the particles comprises at least two substances, one of which is a functional component and the other is an indicator component, wherein the functional component has at least one function selected from the group consisting of a chromic function, an ion exchange function, a luminescence function, a wavelength conversion function, degassing, and drying, and wherein the indicator component comprises a chemically reactive ferromagnetic component which loses a ferromagnetism thereof by a chemical reaction of the chemically reactive ferromagnetic component with a reactive gas or light existing around the functional ferromagnetic particles proceeding with time, the particles losing the ferromagnetism thereof by the chemical reaction of the ferromagnetic component over time.

2. A self-metabolic functional material according to claim 1, wherein the chemically reactive ferromagnetic component is an iron compound, and the reactive gas is oxygen.

3. A self-metabolic functional material according to claim 1, wherein each of the functional ferromagnetic particles is a porous particle containing superfine particles of an iron compound as the chemically reactive ferromagnetic component, the superfine particles being dispersed in the porous particle.

4. A self-metabolic functional material according to claim 1, wherein the particles are colloidally dispersed in the fluid, and the fluid is a liquid.

5. A self-metabolic functional material according to claim 1, wherein the chemically reactive ferromagnetic component is a metal oxide, wherein the metal is selected from the group consisting of manganese, iron, cobalt, nickel, copper and zinc.

6. A self-metabolic functional material according to claim 5, wherein the metal oxide is magnetite.

7. A self-metabolic functional material comprising chargeable functional particles having an electric charge dispersed in a dielectric fluid, wherein each of the particles comprises a functional component and an indicator component, wherein the functional component has at least one function selected from the group consisting of a chromic function, a catalytic function, an adsorption function, a luminescence function and a wavelength conversion function, and wherein the indicator component comprises a chargeable component which loses an electric charge thereof by a reaction with an ion conductive material or by an adsorption of a molecule existing around the chargeable functional particles proceeding with time, the chargeable functional particles losing the electric charge thereof by the reaction or the adsorption of the chargeable component with time.

8. A self-metabolic functional material according to claim 7, wherein the chemical reaction of the chargeable component is one selected from the group consisting of a decomposition reaction, a redox reaction, a ring-opening reaction, a depolymerization reaction and a charge-transfer reaction, and the chemical reaction is an ion generating reaction for generating an ionic conductive material, the chemical reaction being caused by at least one stimulation selected from the group consisting of light, heat, electricity and molecules existing around the chargeable particles, and being proceeded with time.

9. A self-metabolic functional material according to claim 8, wherein an ion of the ionic conductive material is at least one selected from the group consisting of a proton, an organonitrogen ion, an organooxygen ion, an organosulfur ion and a halogen ion.

10. A self-metabolic functional material according to claim 7, wherein the catalytic function is deodorization or combustion.

11. A self-metabolic functional material according to claim 7, wherein the adsorption function is at least one selected from the group consisting of deodorization, degassing, and drying.

* * * * *

UNITED STATES PATENT AND TRADEMARK OFFICE
CERTIFICATE OF CORRECTION

PATENT NO. : 5,424,041
DATED : June 13, 1995
INVENTOR(S) : Kishimoto

It is certified that error appears in the above-indentified patent and that said Letters Patent is hereby corrected as shown below:

Title page, item [57], Abstract, line 21, change "means" to "device".

Signed and Sealed this

Third Day of June, 1997

Attest:

BRUCE LEHMAN

Attesting Officer

Commissioner of Patents and Trademarks